United States Patent
Åvist et al.

(10) Patent No.: US 11,765,192 B2
(45) Date of Patent: Sep. 19, 2023

(54) SYSTEM AND METHOD FOR PROVIDING CYBER SECURITY

(71) Applicant: HoxHunt Oy, Helsinki (FI)

(72) Inventors: Pyry Åvist, Espoo (FI); Mika Aalto, Helsinki (FI); Max Mikkola, Helsinki (FI); Pasi Salo, Helsinki (FI); Jarkko Kallio, Helsinki (FI)

(73) Assignee: HoxHunt Oy, Helsinki (FI)

( * ) Notice: Subject to any disclaimer, the term of this patent is extended or adjusted under 35 U.S.C. 154(b) by 266 days.

(21) Appl. No.: 16/787,760

(22) Filed: Feb. 11, 2020

(65) Prior Publication Data
US 2021/0250369 A1 Aug. 12, 2021

(51) Int. Cl.
*H04L 9/00* (2022.01)
*H04L 9/40* (2022.01)

(52) U.S. Cl.
CPC ...... *H04L 63/1433* (2013.01); *H04L 63/1416* (2013.01); *H04L 63/1425* (2013.01); *H04L 63/1441* (2013.01)

(58) Field of Classification Search
CPC ............ H04L 63/1433; H04L 63/1416; H04L 63/1425
USPC .......................................... 726/22
See application file for complete search history.

(56) References Cited

U.S. PATENT DOCUMENTS

| | | | |
|---|---|---|---|
| 8,695,100 B1* | 4/2014 | Cosoi .................. | H04L 63/0227 726/22 |
| 2008/0215607 A1* | 9/2008 | Kaushansky .......... | G06Q 30/02 707/999.102 |
| 2011/0173142 A1* | 7/2011 | Dasgupta ............... | G06N 20/00 709/206 |
| 2017/0013002 A1* | 1/2017 | Stevenson ........... | H04L 63/1416 |

(Continued)

FOREIGN PATENT DOCUMENTS

EP 3281144 B1 5/2020

OTHER PUBLICATIONS

PCT, Notification of Transmittal of The International Search Report and The Written Opinion of The International Searching Authority, or The Declaration, Application No. PCT/FI2021/050033, dated Mar. 24, 2021, 14 pages.

*Primary Examiner* — Christopher J Brown
(74) *Attorney, Agent, or Firm* — ZIEGLER IP LAW GROUP, LLC

(57) ABSTRACT

A system for providing cyber security, having a server arrangement communicatively coupled to a plurality of user devices. The server arrangement configured to receive communications from communication sources; forward received communications to the user devices; receive feedbacks, associated with the forwarded communications from one or more user devices to identify potential threat communications; analyze the received communications to generate a plurality of clusters based on one or more shared attributes associated with the received communications; identify one or more clusters as potential threat clusters, including the at (Continued)

least one potential threat communication; analyze at least one threat indicator communication, selected from each of the identified one or more potential threat clusters, to determine a threat level associated therewith; and classify the one or more potential threat clusters as threat clusters, if the threat level of the at least one threat indicator communication is above a threshold threat level.

18 Claims, 5 Drawing Sheets

(56) References Cited

U.S. PATENT DOCUMENTS

| | | | |
|---|---|---|---|
| 2018/0191754 A1* | 7/2018 | Higbee | G06F 21/554 |
| 2018/0255084 A1* | 9/2018 | Kotinas | G06K 9/6251 |
| 2021/0168161 A1* | 6/2021 | Dunn | G06N 20/00 |

* cited by examiner

SYSTEM AND METHOD FOR PROVIDING CYBER SECURITY

TECHNICAL FIELD

The present disclosure relates generally to having secured communication; and more specifically, to systems and methods for providing cyber security.

BACKGROUND

In the era of technology, corporations and organizations are prone to cyber-attacks. The most common cyber-attacks and threats that compromise individual users, corporations and organizations are for example ransomware, phishing attacks, text lures, look-a-like domain, brand impersonation, social graph. Cyber-attacks can result in a direct loss of money, loss of confidential information, loss of data integrity, loss of customer confidence, loss of brand value, sabotage, infection with computer viruses, database invasions, and other losses. Typically, organizations have Security Operations Centers (SOCs) to deal with such cyber-attacks. The SOCs include computing arrangement, which may involve human involvement or may be automated, for addressing the cyber-attacks. Generally, the SOCs come into action based on identifying any potential threat communication or when such threat communication is being reported to the SOCs.

Conventionally, the SOCs analyze the threat communications to determine a threat level associated with the potential threat communications, and thereafter identifying them as real or unreal threat communications. Problem occurs when there are too many reported (or potential) threat communications that need to be processed by the SOCs. The real problem with processing the large number of threat communications is that, not all the reported threat communications involve a high threat level (or is a real threat communication). Therefore, such unreal threat communications add unnecessary processing load on the SOCs. Further, the SOCs would be expected to process the reported threat communications efficiently, as delay or inefficient handling of such threat communications may lead to cyber-attack.

For example, when a compromise is found e.g. in the emails (or other communication means as Skype®, Whatsapp®, Facebook®, etc.) the company's IT security system or a team needs to act fast for a part of or all email accounts or accounts of other communication means within a company domain. The challenge is how to group reported threats. If in the organization of for example 10 000 people, there are 500 people who receive attacks and for example 80% of them report the threat, there are 400 reports. In meantime if for example about 1000-1500 users report some other harmful but not as dangerous email or other messages, such as spam, then there is about 1400-1900 reports to act.

Among different type of cyber-attacks, phishing, i.e. a fraudulent attempt to obtain sensitive information such as usernames, passwords and credit card details by disguising as a trustworthy entity in an electronic communication, is one of the most challenging security concerns across all industries. Phishing affects organizations of all sizes. It takes the advantage of the weakest link in security, the human element. The attacks are becoming more sophisticated and the rate of incidents is increasing.

The currently available solutions are not able to respond to attacks automatically nor to protect the greater society from similar attacks. At best, these tools are able to notify the cyber security team of the specific customer organization, who then need to act manually to stop the threat from escalating in their networks. Furthermore, current solutions are not able to scale the response globally to all of their customers and each organization has to act individually.

Therefore, in light of the foregoing discussion, there exists a need to overcome the aforementioned drawbacks associated with efficient handling of the cyber-attacks. Furthermore, there is a need for effective remedies to the one of the worst cybersecurity threats, i.e. phishing attack problems.

SUMMARY

The present disclosure seeks to provide a system for providing cyber security. The present disclosure also seeks to provide a method for providing cyber security. The present disclosure seeks to provide a solution to the existing problem of processing a large number of reported (or potential) threat communications. An aim of the present disclosure is to provide a solution that overcomes at least partially the problems encountered in prior art, and provides efficient processing of the large number of reported threat communications.

In one aspect, an embodiment of the present disclosure provides a system for providing cyber security, the system comprising a server arrangement communicatively coupled to a plurality of user devices, the server arrangement configured to:
  receive a communication from one or more communication sources;
  forward the received communications to the plurality of user devices;
  receive a feedback, associated with the forwarded communications from one or more user devices of the plurality of user devices, to identify at least one potential threat communication;
  analyze each of the received feedbacks to generate a plurality of clusters based on one or more shared attributes associated with the received communications;
  identify one or more clusters, from the plurality of clusters as potential threat clusters, including the at least one potential threat communication;
  analyze at least one threat indicator communication, selected from each of the identified one or more potential threat clusters, to determine a threat level associated therewith;
  classify the one or more potential threat clusters as threat clusters, if the threat level of the at least one threat indicator communication is above a threshold threat level; and
  perform one or more corrective actions for managing communications associated with the threat clusters.

In another aspect, an embodiment of the present disclosure provides a method for providing cyber security, the method being implemented by a system comprising a server arrangement communicatively coupled to a plurality of user devices comprising:
  receiving a communication from one or more communication sources;
  forwarding the received communications to the plurality of user devices;
  receiving a feedback, associated with the forwarded communications from one or more user devices of the plurality of user devices, to identify potential threat communications;

analyzing each of the received feedbacks to generate a plurality of clusters based on one or more shared attributes associated with the received communications;

identifying one or more clusters, from the plurality of clusters as potential threat clusters, including the at least one potential threat communication;

analyzing at least one threat indicator communication, selected from each of the identified one or more potential threat clusters, to determine a threat level associated therewith;

classifying the one or more potential threat clusters as threat clusters, if the threat level of the at least one threat indicator communication is above a threshold threat level; and performing one or more corrective actions for managing communications associated with the threat clusters.

The aim of the disclosed solution is achieved by combining the machine learning and other artificial intelligence technologies, a large-scale human input, clustering different type of attacks, threat scoring in disclosed system and method for detecting, assessing and blocking efficiently phishing and other cyber-attacks. The advantages of the disclosed system and method are following.

The large-scale human input data is collected from existing cyber security awareness training platforms that use machine learning to build unique individual training paths, i.e. funnels, for each user. The training platform has enabled to collect a proprietary and unique database of more than 237,000 reported threats. That is constantly updated with the newest attack methods globally. Using threat scoring by the system and method enable to identify accurate estimates of the current threat level facing users. Using the large global scale human input by the system and method enables to overcome the problems encountered in prior art which lack the component of human data input. The disclosed system and method enable to reduce significantly the risk of users falling for example social engineering attacks and other attacks. With effective clustering the disclosed system and method enable to reduce significantly the number of threat reports.

The disclosed system and method help to stop cyber-attacks ranging from ransomware to behaviour influencing campaigns by adversarial nation states. The system and method make it possible to reach near real-time threat analysis, sandboxing, and remediation. The system and method simulate vectors (i.e. phishing attacks) that are indistinguishable from real threats and through a gamified reporting experience the users (e.g. employees) are rewarded and motivated by highlighting their success to report both simulated and real attacks.

The disclosed system and method can be used for example by large multinational organizations, wherein the advantage is that it turns the organization's employees into willing and capable allies in the task to stop phishing and other cyber-attacks. The system enables to train and monitor employees during the employees life-cycle within the company. The Individual Learning Paths are used as funnels to take into consideration the responsibilities of positions of each user within an organization and train the person accordingly. For example, people working in HR are more likely to be attacked using fake CVs, whereas CFOs are more likely to receive fake invoices. Each user will be trained by the disclosed system and method to recognize the attacks that are specific to their positions. In contrast to the known cyber security awareness training platform solutions that use a one-size-fits-all approach, which still leaves employees vulnerable to attacks, the disclosed system and method enable any organization or user to fend off the attacks and increase security awareness. These advantages enable that the organizations do not need to hire dedicated cyber security teams, because the system and method act automatically.

Embodiments of the present disclosure substantially eliminate or at least partially address the aforementioned problems in the prior art, and enable in efficiently processing a large number of reported threat communications by forming potential threat clusters of such reported threat communications and processing such potential threat clusters.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
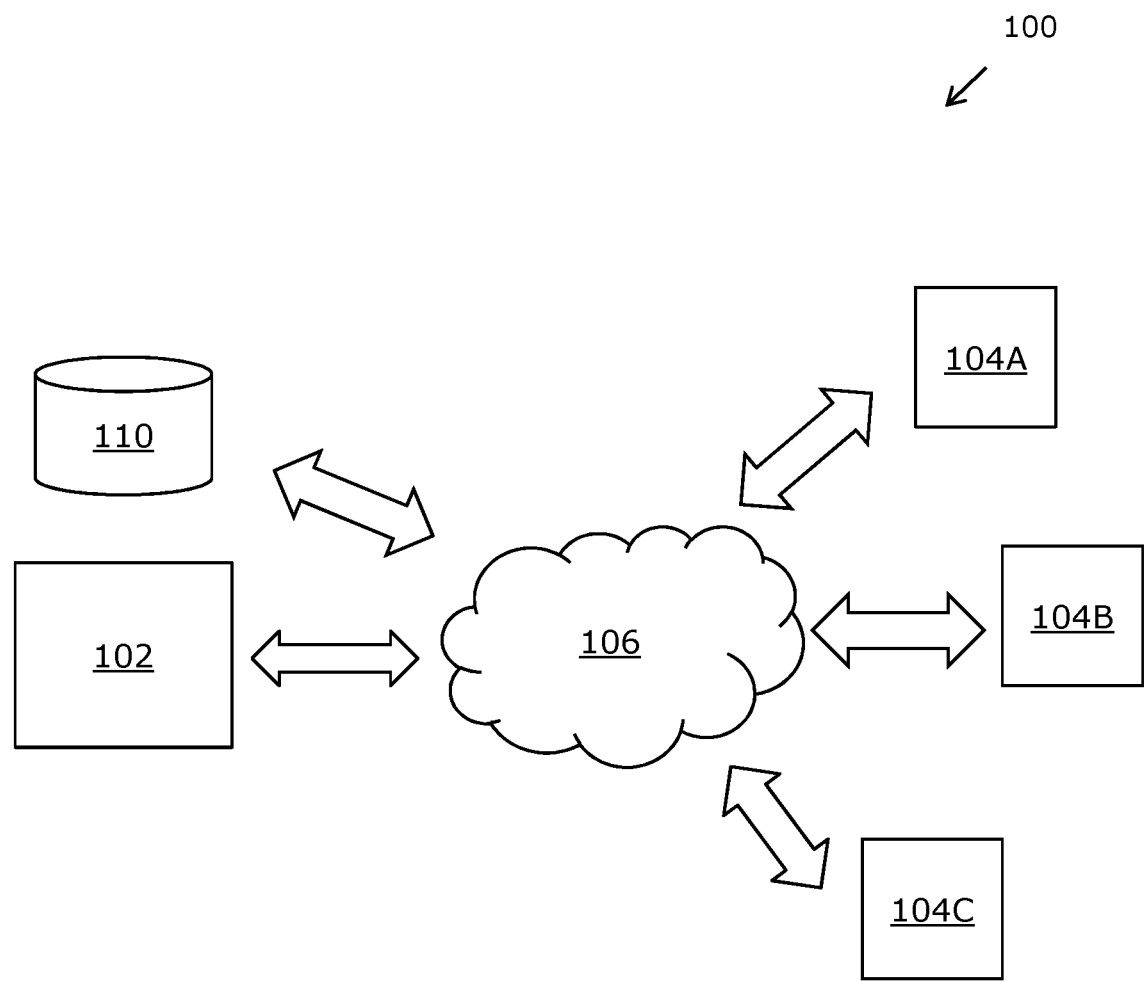
FIG. 1 is a schematic illustration of an exemplary environment of a system for providing cyber security, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

The present disclosure provides a system for detection of cyber-attacks and responding to the detected cyber-attacks, thereby providing cyber security to the plurality user devices. The present disclosure provides a system for effectively grouping similar communications into different clusters in real-time or near real-time, thereby considerably decreasing a number of communications to be analysed individually. The present disclosure also provides a system for determining a level of threat of malicious content received in the user device, and further perform actions on the malicious content based on the level of threat imposed by the malicious content. The present disclosure provides a system for autonomously or semi-autonomously detecting one or more threats and performing actions on the detected threats to provide cyber security within a communication network.

Throughout the present disclosure, the term "server arrangement" relates to an arrangement of at least one server configured to provide cyber security in the organization. The term "server" generally refers to an application, program, process or device in a client-server relationship that responds to requests for information or services by another application, program, process or device (a client) on a communication network. The term "server" also encompasses software that makes the act of serving information or providing services possible. Moreover, the term "client" generally refers to an application, program, process or device in a client-server relationship that requests information or services from another application, program, process or device (the server) on the communication network. Importantly, the terms "client" and "server" are relative since an application may be a client to one application but a server to another application. The term "client" also encompasses software that makes the connection between a requesting application, program, process or device and a server possible, such as an FTP client. Herein, the client may be the plurality of user devices that are communicatively coupled to the server arrangement via the communication network.

It will be appreciated that the aforementioned server arrangement can be implemented in several ways. In an example, the at least one server of the server arrangement could be directly coupled in communication with a given entity device associated with a given user device, via the communication network. In such an example, the at least one server is configured to perform all the functions of improving cyber security. In another example, the server arrangement could have a distributed architecture wherein the server arrangement could comprise a plurality of servers that are coupled in communication with a given user device associated with a user, via the communication network. In such a case, there can be a first server (namely, a "front-end server") that is directly coupled in communication with the given entity device, and at least one server (namely, at least one "back-end server") that is coupled in communication to the first server. In operation, the first server can be accessed by the given user using the given user device, via the communication network. In yet another example, server arrangement could be implemented by way of a cloud server arrangement.

The present system can be deployed to third parties, for example an organization, as part of a service wherein a third party virtual private network (VPN) service is offered as a secure deployment vehicle or wherein a VPN is built on-demand as required for a specific deployment. A VPN is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site. Access to the software via a VPN can be provided as a service by specifically constructing the VPN for purposes of delivery or execution of the process software (i.e., the software resides elsewhere) wherein the lifetime of the VPN is limited to a given period of time or a given number of deployments based on an amount paid. In other examples, the present system as a service can also be deployed and integrated into the IT infrastructure of the organisation.

Throughout the present disclosure the term "user devices" as used herein refers to electronic devices configured to receive communications forwarded by the server arrangement and enable the users to send communications and report potential threat communications. Notably, the plurality of user devices is associated with a plurality of users. In one or more examples, the plurality users may belong an organization. Throughout the present disclosure the term "organization" as used herein collectively refers to a business entity, a business organization, an enterprise, a company, etc. The organization may employ the system for providing cyber security to the organization and the plurality of user devices within the organization. Examples of the user devices include, but are not limited to, mobile phones, smart telephones, Mobile Internet Devices (MIDs), tablet computers, Ultra-Mobile Personal Computers (UMPCs), phablet computers, Personal Digital Assistants (PDAs), web pads, Personal Computers (PCs), handheld PCs, laptop computers, and desktop computers. Notably, each of the plurality of user devices is communicatively coupled to the server arrangement via a communication network. It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks.

In the present disclosure, the server arrangement is configured to receive communications from one or more communication sources. Throughout the present disclosure, the term "communication" as used herein relates to electronic media that may be received in one or more user devices or may be sent from one or more user devices. Optionally, the communications include any transfer of signs, signals, writing, images, sounds, data, or intelligence of any nature transmitted in whole or in part by wire, radio, electromagnetic, photo electronic, or photo-optical systems. Examples of different communications include, but are not limited to, electronic mails (emails), instant messaging services such as short message service (SMS), website, text messaging via mediums such as WhatsApp®, Skype®, Hangouts®, Instagram® and the like, voicemail and video messaging via mediums such as WhatsApp®, Skype®, Hangouts®, Instagram® and the like.

Throughout the present disclosure the term "communication sources" as used herein relates to a medium or a channel via the one or more communications are transmitted to the server arrangement. In one or more examples, the communication sources can also be referred to communication channels. Herein, the communication channel may be a pathway through which communications are sent to the plurality of user devices. Optionally, the server arrangement comprises a receiver to receive messages from each of the one or more communication sources. Examples of one or more communication sources include, but are not limited to, email transfer channels, instant messaging applications (e.g. WhatsApp®, Skype®, Hangouts®, Instagram®, Telegram®, Snapchat®, and Hike®).

The server arrangement is configured to forward the received communications to the one or plurality of user devices. Optionally, the server arrangement comprises a router for transmitting the received communication to each of the plurality of user devices. Notably, the server arrangement is configured to access metadata such as sender's information and the receiver's information, IP address of the source, IP address of the destination and the like. In an example, the server arrangement is configured to forward the received communication to respective user devices for which the received communication is intended. In one or more embodiments, the server arrangement further comprises a firewall to filter the received communication prior to forwarding communication to plurality of user devices, wherein the firewall is a system designed to prevent unauthorized access to or from a private communication network. The firewall can be implemented in either hardware or software form, or a combination of both. The firewalls prevent unauthorized users from accessing the communication network of the organization. Notably, all the communications received in the server arrangement pass through the firewall, which is implemented to examine received communications and block the communications that do not meet the security criteria defined by a set of rules.

The server arrangement is configured to receive feedbacks, associated with the forwarded communications from one or more user devices of the plurality of user devices, to identify potential threat communications. Herein the term "feedback" refers to an action of reporting the communications received in the user device. It will be appreciated that one or more communications that are considered to be potentially malicious by a particular user, are reported by the user in order to report the received communication. Notably, feedbacks for a particular communication are received from the one or more user devices associated with users considering the particular communication as a threat, or having malicious content.

According to an embodiment, each of the plurality of user devices comprises a plugin, for example in the form of a user interface element, to provide feedbacks in response to the forwarded communications. Throughout the present disclosure, the term "plugin" as used herein refers to software additions, add-ons that allow for the customization of computer programs, apps, and web browsers; as well as the customization of the content offered by various web pages.

The term "user interface" as used herein refers to a structured set of user interface elements rendered on a display screen. Optionally, the user interface (UI) rendered on the display screen is generated by any collection or set of instructions executable by an associated digital system. Additionally, the user interface (UI) is operable to interact with the user to convey graphical and/or textual information and receive input from the user. Specifically, the user interface (UI) used herein is a graphical user interface (GUI). Furthermore, the user interface (UI) elements refer to visual objects that have a size and position in user interface (UI). A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like.

In an example, a plugin can be provided in different web pages that the user is most likely to receive threats from, such as email web pages, and other frequently browsed web pages. The plugin is adapted to be implemented by a user to report any of the communications forwarded to a user device associated therewith. Notably, the communications that are reported by the user, via the plugin are identified as potential threat communication. Hereinafter, the term "potential threat communications" is used to refer to the communications received by users and eventually reported by the users via the plugin.

For example, if a first users receives email from a second user and the first user reports this as suspicious. Then either the second user is automatically halted or the second user is asked via other communication channel if this is true. If no answer within predetermined moment of time then the second user is halted by the system. In another embodiment, if the plugin has not seen the second user to use the email then email is marked suspicious as a potential threat.

The server arrangement is configured to analyze each of the received communications to generate a plurality of clusters based on one or more shared attributes associated with the received communications. Throughout the present disclosure the term "cluster" as used herein relates to a group comprising a number of communications having a common attribute. The term "attribute" refers to the semantic content features, e.g. visual elements, language, semantic meaning, language intent (i.e. call to actions like "click this") and secondary clustering features, e.g. email address, email or instant message subject, email or instant message content, attached filename, attached file type, sender information, IP address etc.

It will be appreciated that a particular cluster comprises at least two communications having a common attribute. Optionally, the one or more shared attributes comprise at least one of: a semantic relation of textual content between the received communications, a visual presentation of the received communications, a language intent of the received communications, an origin information of the received communications, a format of the received communications, an embedded information in the received communications. It is to be understood that in one or more examples, hundreds and thousands of communications are received for analysis to determine a threat, considerably reducing processing speed in conventional systems. However, clustering the communications into different clusters, efficiently segregates a number of communications thereby reducing processing time required to analyze individual communications.

Optionally, two or more communications having a semantic relation between the textual content of each of the communications will be grouped together into one cluster. Throughout the present disclosure the term "semantic relation" relates to a logical and conceptual relation of a textual content in a given communication with another communication, that accurately depicts semantic (namely, logical and meaningful) relation of textual content in a simple manner. Optionally, in order to determine a semantic relation between one or more received communications, a semantic representation of each of the communications is to be generated. Herein, "semantic representation" of the received communication can be understood to be an abstract language detailing of data elements associated with the received communication, and interrelationships between such data elements. The semantic representation of the received communication may employ symbols, alphabets, numbers, and the like, to describe the semantic information of the given data by way of semantic sentences. Typically, the semantic representation of the received communication is in a machine-understandable format, and can easily be processed by the server arrangement.

Optionally, the server arrangement performs natural language processing on the received communications to generate the semantic representation and establish semantic relations between one or more received communications. Herein, the natural language processing is performed based upon at least one natural language in which the communication is received. It will be appreciated that the communication is generally in the form of the at least one natural language of humans, and therefore, may require processing for the server arrangement to truly understand such information, and subsequently analyze the received communication. In an example, the server arrangement may employ at least one artificial intelligence algorithm to perform natural language processing on the received communications to establish semantic relations between one or more received communications.

Optionally, the natural language processing on the received communication is performed by way of at least one of: machine translation of the received communication, topic segmentation of the received communication, word sense disambiguation of the received communication, lemmatization of the received communication, parsing of the received communication, word segmentation of the received communication, morphological segmentation of the received communication, analyzing lexical semantics of the received communication, speech recognition of the received communication, speech segmentation of the received communication, summarization of the received communication.

Optionally, two or more communications having common visual presentation will be grouped together into one cluster. Herein the term "visual presentation" refers to visual objects that have a size and position in the presentation of the received communications. Examples of visual presentation include, but are not limited to, fonts, colors, text blocks, labels, text boxes, list boxes, lines, and images windows, dialog boxes, frames, panels, menus, buttons, and icons. In addition to size and position, visual presentation may also include other properties, such as a margin, spacing, or the like.

Optionally, two or more communications having a common language intent will be grouped together into one cluster. Herein the term "language intent" refers to a motive of the language that lure the users into performing an action on the received communication. There are several terms that can be usually associated with malicious content. In an example, the language intent is determined using specific terms such as "CLICK HERE", "CLICK AND WIN", "YOU HAVE WON A PRIZE", "YOUR MEMORY IS FULL", "YOU HAVE A VIRUS" and the like.

Optionally, two or more communications having a common origin information will be grouped together into one cluster. Herein the term "origin information" primarily refers to a domain name or IP address of the received communication. Alternatively, the origin information may also include a name of the protocol used as the primary access medium, a sub-domain name, a path to a specific page or file within a domain, a network port to use to make a connection, a specific reference point within the received communication, such as a named anchor in an HTML file; and a query or search parameters used.

Optionally, two or more communications having a common format will be grouped together into one cluster. Herein the term "format" relates a structure and a type of data stored in a received communication. The structure of a communication may include a header, metadata, saved content, and an end-of-file (EOF) marker. Examples of different formats of the received communications include, but are not limited to, Word documents (.doc), Web text pages (.htm or .html), Web page images (.gif and .jpg), Adobe Postcript files (.ps), Adobe Acrobat files (.pdf), Executable programs (.exe), and Multimedia files (.mp3 and others)

Optionally, two or more communications having a common embedded information will be grouped together into one cluster. Herein, the term "embedded information" refers to one or more links or URLs that are attached with one or more communications.

According to an embodiment, the server arrangement is configured to generate the plurality of clusters by
    identifying one or more shared attributes of a first received communication and a second received communication;
    determining a similarity score for the identified one or more shared attributes; and
    generating a cluster, including the first received communication and the second received communication, if the determined similarity score is above a threshold similarity score.

Optionally, the one or more identified shared attributes may be: a semantic relation of textual content between the received communications, a visual presentation of the received communications, a language intent of the received communications, an origin information of the received communications, a format of the received communications, an embedded information in the received communications. Herein, the terms "first received communication" and the "second received communication" refer to any two received communications. Further the terms "first received communication" and "second received communication" do not represent any order and should not unduly limit the scope of the claims appended herein.

Notably, the one or more identified shared attributes are compared with each other to determine a similarity between the first received communication and the second received communication, thereby determining the similarity score. Herein, the term "similarity score" refers to a value determined to quantify a similarity between the first received communication and the second received communication. In particular, the similarity score is used represent similarity between an identified shared attribute of the first received communication with the identified shared attribute of the second received communication. In an example, the similarity score is determined by comparing one shared attribute between the first received communication and the second received communication. In another example, the similarity score is determined by comparing several shared attributes between the first received communication and the second received communication. In such a case, a similarity score is calculated for each of the identified shared attributes, and consecutively a cumulative similarity score is determined by aggregating each of the calculated similarity scores calculated for each of the identified shared attributes between the first received communication and the second received communication. It will be appreciated that the higher the similarity score is, the higher is the resemblance of type of threat between the first received communication and the second received communication. Therefore, higher similarity score, the first received communication and the second received communication have a higher probability of being assigned to a common cluster.

In the step of generating a cluster, including the first received communication and the second received communication, if the determined similarity score is above a threshold similarity score, the "threshold similarity score" refers to the similarity score above which the first received communication and the second received communication are assigned to a common cluster. Optionally, the threshold similarity score is autonomously calculated by the server arrangement, or the threshold similarity score is pre-defined by one or more users of the system.

In an example, a semantic representation is generated for the textual content in the first received communication and the second potential threat communication. The semantic representation of the first received communication is compared with the second received communication to establish a semantic relation. Further, a similarity score is determined based on the established semantic relation, and a cluster is generated if the determined similarity score is above a predetermined threshold similarity score.

Further, the server arrangement is configured to identify one or more clusters, from the plurality of clusters as potential threat clusters, including the at least one potential threat communication. Notably, once the plurality of clusters are generated, one or more clusters are identified from the plurality of clusters having the at least one potential threat communication, then the one or more clusters are flagged as potential threat clusters. Optionally, the each of the potential threat communications are compared with the each of the received communications in each of the plurality of clusters, and flag the one or more clusters as potential threat clusters, if the particular cluster comprises at least one potential threat communications. It will be appreciated that each of the clusters may comprise several received communications that may or may not include potential threat communications. Therefore, the clusters that do not include potential threat communications and thereby not flagged as potential threat clusters, can be marked as safe and need not be analysed further.

Further, the server arrangement is configured to analyze at least one threat indicator communication, selected from each of the identified one or more potential threat clusters, to determine a threat level associated therewith. Throughout the present disclosure the term "threat indicator communication" as used herein relates to a communication selected from a potential threat communication for further analysis. Notably, the threat indicator communication serves as a seed in threat analysis for a particular potential threat cluster. Herein, at least one threat indicator communication is selected from each of the one or more identified potential threat clusters for further analysis. In an example, the threat indicator communication is randomly selected from one or more communications in the potential threat cluster. In another example, the threat indicator communication is selected from the potential threat communications in the potential threat clusters. Further, the at least one threat communication indicators are analysed to determine the threat level of the at least one threat communication. It will be appreciated that the term "threat level" refers to an intensity of threat posed by the at least one threat indicator communication. Notably, the threat level is an indicator determining an intensity of damage that a particular communication can cause to the user device and information associated therewith.

According to an embodiment, the server arrangement is configured to determine the threat level of at least one threat indicator communication by comparing the at least one threat indicator communication with pre-examined communications, each having a threat score associated therewith. Herein, the "pre-examined communications" refer to a plurality of communications that have been analyzed in the past and have been assigned a threat score indicating a threat intensity of the particular pre-examined communication. The "pre-examined communications" can be used to deduce the threat level of a semantic cluster. In an example, the pre-examined communications are the communications received in the past in the organization. In another example, the pre-examined communications are associated with social engineering attacks using words or sentences such as "hurry", "keeping things secret", "payments", "review something quickly", "click here", etc. These types of pre-examined communications can be seen as semantic clusters whereas new clusters analysed and having closer contextual distance to the pre-examined communications will have a higher threat score associated therewith. In another example, the pre-examined communications are the communications that have been examined by other open intelligence sources.

Optionally, the server arrangement is configured to access the pre-examined communications from a cyber security database. Throughout the present disclosure the term "cyber security database" refers to a database comprising the pre-examined communications and the corresponding threat scores. The term "cyber security database" refers to at least one database that when employed, allows for the server arrangement to access from the cyber security database required pre-examined communications and the corresponding threat scores. The term "cyber security database" generally refers to hardware, software, firmware, or a combination of these for storing pre-examined communications in an organized (namely, structured) manner, thereby, allowing for easy storage, access (namely, retrieval), updating and analysis of the pre-examined communications. The term "cyber security databases" also encompasses database servers that provide the aforesaid database services to the server arrangement. It will be appreciated that the data repository is implemented by way of the cyber security databases. Optionally, the cyber security database is communicatively coupled to the server arrangement via the communication network.

In an example, the cyber security database refers to one or more third party databases comprising the pre-examined communications and the corresponding threat scores. In such a case, the server arrangement is configured to directly access the required pre-examined communication and the corresponding threat scores. In another example, cyber security database is an internal database comprising communications that are known threat and the corresponding threat scores. In such a case, the server arrangement is configured to access known threat communications from a plurality of databases, including both open source databases and closed source databases storing known threat communications. The known threat communications for evolving cyber-attack in the form of threat intel may be collected from several open source intelligence sources (OSINT). For example, the known threat communication may include true positive data from threat sources providing labelled indicators of compromise (URL, IP, File), true negative data providing labelled data for legitimate data sources such as actual sites, emails, domains of actual companies used and targeted by attackers, etc. Herein, all the known threat communications are retrieved from different sources and normalized to from a data structure and consequently stored in the cyber security database. In particular, the server arrangement is configured to analyse the accessed known threat communications and to normalize the contents of each of the known threat communications. Further, the content of the known threat communication is analysed to determine a threat score against each of the analyzed known threat communications, that are stored as pre-examined communications in internal database to generate the cyber security database. It will be appreciated that the cyber security database is constantly updated to encompass new and evolving threat communications.

Optionally, the server arrangement is further configured to determine a resemblance score of the at least one threat indicator communication with respect to each of the pre-examined communications. Herein the term "resemblance score" refers to a value assigned to a particular threat indicator communication when compared with a pre-examined communication to determine a relevance therebetween. Notably, the resemblance score indicates how closely a particular threat indicator communication is related to a particular pre-examined communication. Optionally, one or more properties of the threat indicator communication is compared with a corresponding property of each of the pre-examined communication to determine the relevance score. Examples of the one or more properties include, but are not limited to, an origin information and a format. It will be appreciated that a high resemblance score indicates a high correlation between the particular threat indicator communication and the particular pre-examined communication, thereby indicating a higher relevance in the type of threat.

Optionally, the server arrangement is further configured to select a pre-examined communication having a highest resemblance score. Notably, the pre-examined communication having the highest resemblance score is selected, as the selected pre-examined communication is likely to have a threat score most suitable for the threat indicator communication. Optionally, the server arrangement is further configured to assign the threat score of the pre-examined communication, having the highest resemblance score, to the at least one threat indicator communication. In an example, if the highest resemblance score between the threat indicator communication and a pre-examined communication is 90% having a threat score of 60, then the threat score for the threat indicator communication is also 60.

Optionally, the server arrangement is further configured to determine the threat level of the at least one threat indicator communication based on the assigned threat score. Notably, the threat level is determined from the threat score to determine the intensity of threat posed by the threat indicator communication. It will be appreciated that the threat indicator communication may or may not be a serious threat depending upon a value of the threat score accessed from the cyber security database. As aforementioned, the threat level is an intensity of threat posed by the at least one threat indicator communication. Therefore, the threat level is further categorized based on the assigned threat score into at least one of: a low threat level, a moderate threat level and a high threat level. Optionally, the threat level is determined on the basis of a value of the threat score. In an example, the at least one threat indicator communications having a threat score in a range of 0-30 is categorized as having a low threat level, the at least one threat indicator communications having a threat score in a range of 31-70 is categorized as having a moderate threat level, and the at least one threat indicator communications having a threat score in a range of 71-100 is categorized as having a high threat level.

Further, the server arrangement is configured to classify the one or more potential threat clusters as threat clusters, if the threat level of the at least one threat indicator communication is above a threshold threat level. Herein, the threshold threat level is the threat level above which the one or more potential threat clusters are classified as threat clusters. In one or more examples, the threshold threat level is determined by the server arrangement based on a level of security to be offered to each of the plurality of user devices. Notably, each of the communication associated with a particular threat cluster is assigned with a threat level same as the threat level determined for the threat indicator communication associated with the particular threat cluster. Such a system ensures that multiple individual communications having one or more shared attributes need not be analyzed individually to determine a threat level.

According to an embodiment, the server arrangement is configured to perform one or more corrective actions for managing communications associated with the threat clusters. Optionally, the one or more corrective actions comprise at least one of: firewall configuration, port configuration, disable reception of communications from one or more communication channels, remove the communications associated with threat clusters from each of the plurality of user devices, trigger an alert for each of the plurality of user devices. In an example of performing the one or more corrective actions based on the threat level, the server arrangement is configured to modify one or more properties of the firewall in order to block the communications associated with the threat clusters, if the threat level associated with a threat cluster is a moderate level threat. In another example, the server arrangement is configured to trigger an alert for each of the plurality of user devices to delete a particular communication received in each of user devices, if the threat level associated with a threat cluster is a high threat level. Optionally, the server arrangement is configured to perform the one or more corrective actions in real-time.

Optionally, the server arrangement is configured to train a machine learning algorithm to autonomously detect potential threat communications without human intervention, and consecutively block the detected threat communications in order to provide cyber security. Throughout the present disclosure, the term "machine learning algorithm" as used herein refers to software-based algorithms that are executable upon computing hardware and are operable to adapt and adjust their operating parameters in an adaptive manner depending upon information that is presented to the software-based algorithms when executed upon the computing hardware. Optionally, the machine learning algorithms include neural networks such as recurrent neural networks, recursive neural networks, feed-forward neural networks, convolutional neural networks, deep belief networks, and convolutional deep belief networks; self-organizing maps; deep Boltzmann machines; and stacked de-noising autoencoders. Optionally, the machine learning algorithms employ any one or combination of the following computational techniques: constraint program, fuzzy logic, classification, symbolic manipulation, fuzzy set theory, evolutionary computation, cybernetics, data mining, approximate reasoning, derivative-free optimization, decision trees, or soft computing. Moreover, the term "neural network" as used herein can include a highly interconnected network of processing elements, each optionally associated with a local memory. In an example, the neural network may be Kohonen map, multi-layer perceptron and so forth. Furthermore, the processing elements of the neural networks can be "artificial neural units", "artificial neurons", "neural units", "neurons", "nodes" and the like. Moreover, the neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained. It will be appreciated that as the server arrangement implements machine learning algorithms, the more the number of training datasets available for training the machine learning algorithm, the greater is the accuracy of the system in defending cyber-attacks by generating clusters of the received communications.

The present disclosure also relates to the method for providing cyber security. Various embodiments and variants disclosed above apply mutatis mutandis to the method.

Optionally, the method further comprises performing one or more corrective actions for managing communications associated with the threat clusters.

Optionally, in the method, the one or more corrective actions comprise at least one of: firewall configuration, port configuration, disable reception of communications from one or more communication channels, remove the communications associated with threat clusters from each of the plurality of user devices, trigger an alert for each of the plurality of user devices.

Optionally, in the method, the feedbacks are received from the one or more user devices of the plurality of user devices in response to the forwarded communications via a plugin, provided in the form of a user interface element.

Optionally, in the method, the one or more shared attributes comprise at least one of: a semantic relation of textual content between the received communications, a visual presentation of the received communications, a language intent of the received communications, an origin information of the received communications, a format of the received communications, an embedded information in the received communications.

Optionally, the method for generating the plurality of clusters comprises:
 identifying one or more shared attributes of a first received communication and a second received communication;
 determining a similarity score for the identified one or more shared attributes; and
 generating a cluster, including the first received communication and the second received communication, if the determined similarity score is above a threshold similarity score.

Optionally, the method for determining the threat level of at least one threat indicator communication comprises:
 comparing the at least one threat indicator communication, with pre-examined communications each having a threat score associated therewith;
 determining a resemblance score of the at least one threat indicator communication with respect to each of the pre-examined communications;
 selecting a pre-examined communication having a highest resemblance score;
 assigning the threat score of the pre-examined communication, having the highest resemblance score, to the at least one threat indicator communication; and
 determining the threat level of the at least one threat indicator communication based on the assigned threat score.

Optionally, the method comprises accessing the pre-examined communications from a cyber security database.

Optionally, the method comprises performing the one or more corrective actions in real-time.

Optionally, the method comprises performing the one or more corrective actions based on the threat level, and wherein the threat level is further categorized based on the assigned threat score into at least one of: a low threat level, a moderate threat level and a high threat level.

In an embodiment the disclosed method comprises steps of:
 collecting data related to vectors (i.e. attacks), wherein a vector can be a real or simulated attack, for example phishing attack, social network attack, attack, email attack and the data related to vectors comprises information regarding indicator of attack (IOA) and indicator of compromise (IOC);
 training users and neural networks based on the collected data;
 grouping the vectors into clusters based on semantic content;
 checking at least one of the vectors from the selected cluster;
 detecting if there is at least one vector, which is a threat in the selected cluster;
 categorizing the vectors belonging to the selected cluster as a threat;
 generating a protective action request.

Grouping the vectors in clusters can be based for example on semantic content: e.g. visual elements, language, semantic meaning, language intent (e.g. call to action buttons, such as click this) and then by combination of above to create good clusters or alternatively be based on email address, email subject, content, attached filename/type etc.

In an embodiment the disclosed system comprising
a server arrangement configured to
receive communications, for example an email sent from a third party by the communication server (i.e. email server);
forwarding communication to at least one user device (laptop, tablet PC, mobile, smartphone) configured to receive electronic communications and messages, for example email, SMS message, instant message comprising semantic content is received by user device when a browser or corresponding messaging client in the user device is activated;
to receive communication (e. g. a message or file in email, instant message) from the communication server;
to provide a feedback related to the type of the received communication by reporting means integrated into messaging client executed on the user device, wherein the reporting means is for example a "report phishing" button in the email client, web-browser, instant messaging clients, application in mobile, Bot in Slack/ SMS, voice command for smart appliances and wherein communication channel configuration is for example a PC, server or similar operated by the IT support; can also be a firewall, or an email server etc.;
receive the provided feedback from the user device related to the communication, wherein the provided feedback is based on the "report phishing" button activated by a user or based on real-time feedback based on clustering and the real-time feedback is implemented in known threat case by identifying the threat reported to existing group and reporting back to the user via the plugin or the real-time feedback is reported via email, SMS or instant messaging client;

access communications in the communication server, by getting access to the communications forwarded to several (or all) user devices, which is performed by forwarding the communications;

cluster the accessed communications based on communication type, by implementing an artificial intelligence to cluster communications to set of clusters, wherein each cluster representing different type of communications and the clustering can be for example real time or patch, and the clustering can refer to the clustering based on semantic content (e.g. Email from dropbox and look-a-like from cybercriminal could be identical 95% but the semantic intent could be different (e.g. download file)), secondary clustering or subindicators (e.g. threat (email) is split into IP address, web-links etc.);

associate communication related to feedback with a cluster, which refers to putting up a flag that communications which are in the said cluster might have a problem and if the feedback is an indication of attack (e.g. phishing email, message, call), then to mark the associated cluster as risk communication; and configure the communication server to impact delivery of communications which belong to the cluster.

Impact delivery of communications can be for example:

Firewall configuration e.g. SMTP port configuration etc. to block attacks;

Updates/configuration or even closing, of the email accounts, email servers, etc.;

Firewall/Proxy, egress traffic from company is quickly blocked to reach malicious site;

Similar attacks are removed from end point devices (mobile, desktop, servers etc.);

Users that have high risk detected by a cybersecurity system could trigger alarms faster than users with low risk.

Other means can be: mark the email as "spam", disable web-links, remove attached infected files (pictures), delay the communications. Also this can for example disable certain email senders.

In another embodiment the system is configured to rate the similar emails as with the same class. Detected phishing emails are rated and clustered to same class making detecting faster and impact delivery of communications faster. The rating is done in the email server and if phished emails are already in the user's inbox those are removed by the email server.

The disclosed system and method enable to build a unique and constantly updating database of the latest phishing methods. With such a kind data resource, it is possible to distinguish between real threats and simple spam that also get reported as phishing.

The data collected from a user network on attacks related to attacks that have already passed sophisticated commercial filter solutions, thus representing the newest types of attacks happening. This enables to collect high-quality samples for training both the users and also neural networks.

In an embodiment, using gamified simulation, the users are trained to detect strong form phishing attacks. As users are rewarded by the system on reporting both simulated and real phishing attacks, there is a huge motivated human sensor network reporting attacks which currently pass through all the most advanced traditional filters. For example, data related to threats is collected from over 100 Open-source intelligence (OSINT) sources11 (e.g. 1 TB/day). This data comprises, for example, true positive data from threat sources providing labelled indicators of compromise (URL, IP, File), true negative data providing labelled data for legitimate data sources such as actual sites, emails, domains of actual companies used and targeted by attackers, etc. All the collected data is normalized and matched to the data structure and fed to the central cloud-based machine learning platform for future learning.

With this data, multiple different types of machine learning models are trained and then combined these models into a predictive "ensemble" model, significantly improving the model accuracy over any individual model. While more demanding in skill and effort, ensemble modelling is a proven methodology for improving prediction results for complex problems. Its effectiveness depends on the heterogeneity of the member models, and the planned member models.

DETAILED DESCRIPTION OF THE DRAWINGS

Referring to FIG. 1, illustrated is an exemplary embodiment of a system 100 for providing cyber security, in accordance with the present disclosure. As illustrated, the system 100 for providing cyber security comprises a server arrangement 102, a cloud based security database 110, a plurality of user device, namely a first user device 104A, a second user device 104B, and a third user device 104C associated with corresponding users of the system 100. Herein, a cloud based security database 110, the user devices 104A, 104B and 104C communicate with the server arrangement 102 via the secured communication network 106.

FIG. 1 is merely an example, which should not unduly limit the scope of the claims herein. It is to be understood that the specific designation for the system 100 is provided as an example and is not to be construed as limiting the system 100 to specific numbers of server arrangements, user devices, and communication networks.

Figure 2:
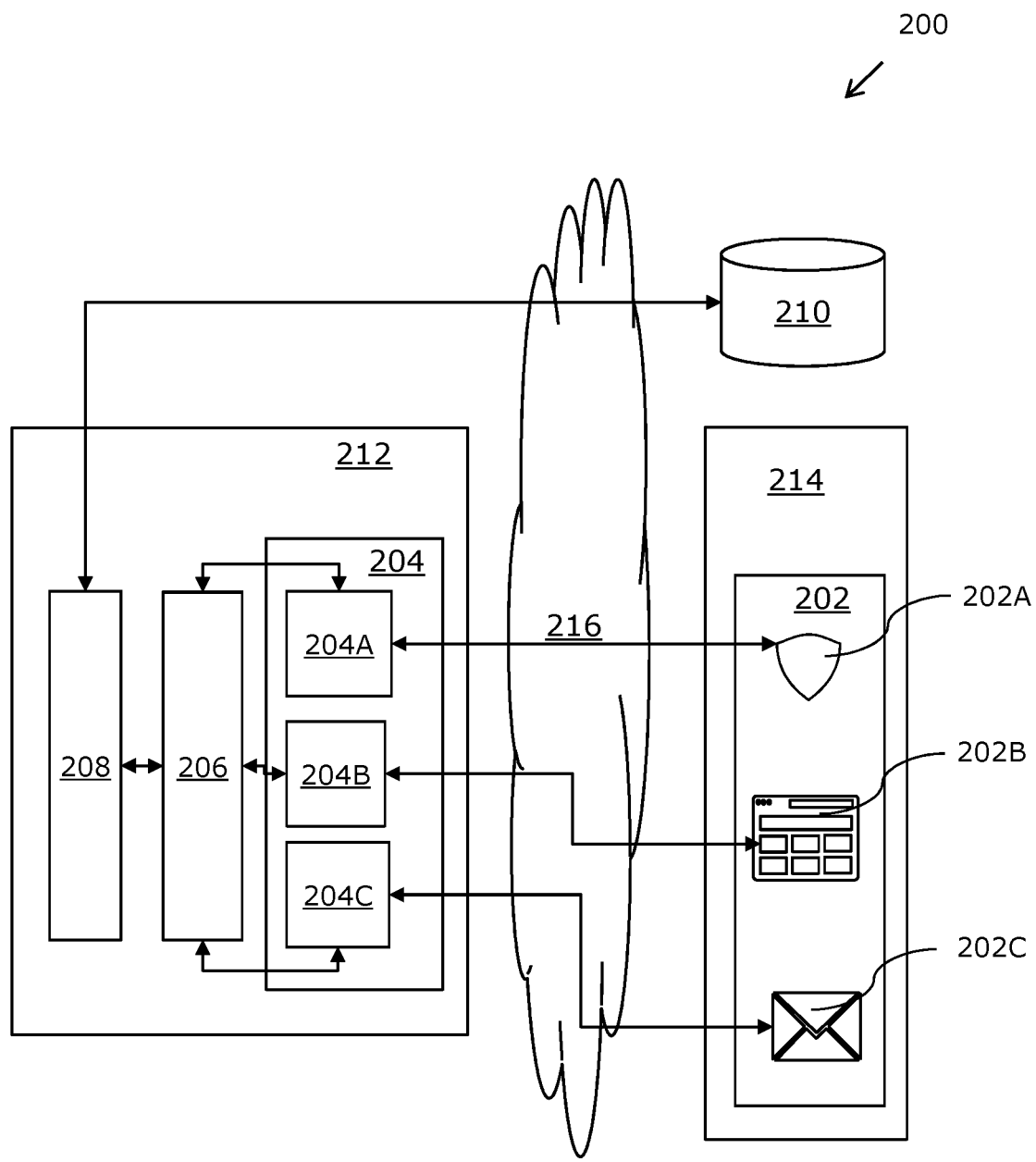
FIG. 2 is a schematic illustration an exemplary architecture of a system (such as the system of FIG. 1) in accordance with an embodiment of the present disclosure.

Referring to FIG. 2, illustrated is an exemplary embodiment of a system 200 (such as the system 100 of FIG. 1), in accordance with the present disclosure by showing the system components and the interaction between the components. The system 200 comprises a three-level interaction for reporting a received communication. As shown, the system 200 for providing cyber security comprises a server arrangement 212, a cloud based security database 210 communicatively coupled to the server arrangement 212 via the communication network 216, a user layer 202 arranged to perform communications between the server arrangement 212 and the user device 214 via the communication network 216. The cyber security database 210 comprises pre-examined communications and the corresponding threat scores that can be accessed by the server arrangement 212 to determine threat level of the threat indicator communications. As an example, the cloud based cyber security database 210 may be distributed depending on geographical location, customer or on domain basis taking care of users in different privacy jurisdictions.

The user layer 202 comprises one or more user applications stored in the user device 214, for example a user plugin 202A in the form of a user interface element, web browser 202B, and a messaging client 202C, wherein the user applications are adapted to communicate via communication network 216 with the server arrangement 212.

The server arrangement 212 of the system 200 comprises a first application program interface layer 204, a second application program interface layer 206, database layer 208, wherein the first application program interface layer 204 comprises a plugin application program interface (API) 204A, a web application 204B, and a message transfer agent (MTA) 204C. As shown, the user plugin 202A is configured to interact with the first application program interface layer 204 via the plugin application program interface (API) 204A. Further, the web browser 202B is configured to interact with the first application program interface layer 204 via the web application 204B. Further, the messaging client 202C is configured to interact with the first application program interface layer 204 via the messaging transfer agent 204C. As further illustrated, the first application program interface layer 204 is configured to interact with a second application program interface layer 206. The second application program interface layer 206 is configured to interact with the database layer 208, that is configured interact with the cloud based cyber security database 210 and to operate considering the user geographical location and privacy regulations in different jurisdictions (e.g. GDPR) to enable to provide cyber security to the users from different locations and to the large organizations having users in different privacy jurisdictions.

Via the plugin application program interface 204A the server arrangement 212 is configured to determine from the information provided in the email content the next action either to implement the user training algorithm or if the user is reporting real threat then the server arrangement 212 is configured to initiate the data processing cycle.

The web browser 202B illustrates a client running on the user device 214 and is configured to execute actions as commanded by the web application 204B, initiated by the user, the web browser 202B is configured to upload the threat through the web application 204B into the server arrangement 212.

The message transfer agent 204C is further configured to fetch data, i.e. the entire content of the email. The different type of communications between the user device 214 initiated by the user plugin 202A, web browser 202B, messaging client 202C, and the server arrangement 212 are delivered by secure transfer mechanism and processed in the second application program interface layer 206. The email communications from second application program interface layer 206 to the messaging client 202C of the user device 214 via email transfer agent 204C, wherein the delivered communication is a regular email message or a training content.

In an embodiment when the system is used by individual users the communications between the user device and the system are changed directly through the email service provider who stores all the email data. In an embodiment where the system is used by an organization, the communications can be changed directly in case the organization uses self-hosted mail server for storing all the email data or through the external server if the organization uses email service provider who stores all the email data.

Figure 3:
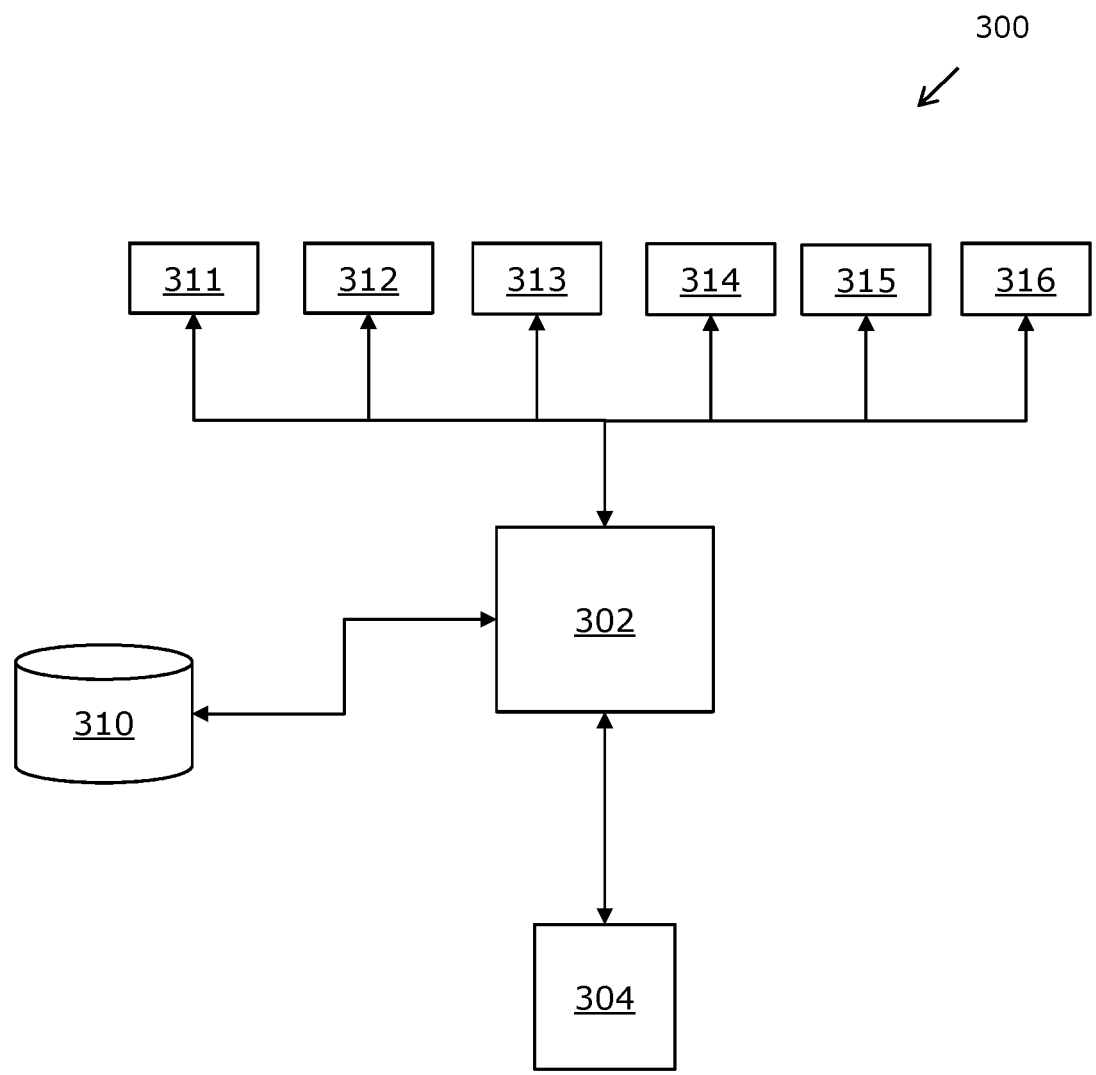
FIG. 3 is an illustration of examples of the communications comprising potential threats to be identified.

Referring to FIG. 3, illustrated is an embodiment of the present disclosure, wherein examples of the communications comprising potential threats sent by the user devices 311, 312, 313, 314, 315, 316, received by a server arrangement 302, which communicates with a security database 310 and wherein the communications have been forwarded from the server arrangement 302 to the user device 304 to be reported and sent feedback associated to the communications, back to the server arrangement 302 to detecting whether the communications contain any threats.

The examples of the potential threats of the communications that the first user devices 311, 312, 313, 314, 315, 316 can send and need to be analysed by the server arrangement 302, may comprise for example following type of threats to be detected.

Detecting Text Lure threats by multilingual Natural Language Processing (NLP) to detect imperative classes or content from textual content within emails such as "click here", "act now", "urgent". The model used in the system provides information if given text contains a call to action. Advanced NLP methods are used to detect also slight arbitrary variations that are often used by phishing attackers to circumvent traditional cybersecurity systems and methods.

Detecting Look-a-like domain threats by the model, which detects whether a given e-mail sender domain is employing look-a like-attacks such as homograph attacks. The model uses a combination of deep convolutional neural network based on the machine vision and heuristic algorithms to give score whether the given domain is employing said techniques.

Detecting brand impersonation threats of advanced spear phishing attacks, which typically masquerade themselves to come from a trusted source such as a well-known brand or co-worker. The model used to detect such kind of threats provides an indication of probability for whether such a trusted source is potentially being impersonated. A deep neural network methods for example Single Shot Multibox Detector and YOLOv3 are used to detect if a known brand's logo or other insignia is visible in any given attack.

Detecting Social Graph threats of the individual is used to detect if a given communication from a co-worker is likely to come from the indicated source. This gives a powerful feature to detect business email compromises. I.e., if there is no regular social connection between the target and the potentially impersonated co-worker, more confidence can be gained that it is a true attack. The latest state of the organization's social graph is collected by monitoring the organization's email flows at the sender-to-recipient level.

The model rates each IOC (IP, URL, File) for its probability of being malicious. Several support vector machines (SVM) and decision tree-based classification algorithms are evaluated for this problem, and train these machine learning algorithms with previously collected OSINT data.

Detecting Payload Detonation Chamber threats for example by Open source tools such as Cuckoo Sandbox for assessing if any included URLs or attachments contain cyber-threats.

For combining these models, for example stacking ensemble is used for deep learning to train a deep neural network which provides a rating and confidence on each reported threat. Essentially, a model is trained by the disclosed system, which learns how to best combine the predictions from multiple existing models. With this final model, reported threats are prioritized and the system automatically removes and blocks threats above certain significance from the whole database.

The same model and data are used for training users. With the knowledge of the newest attack methods the disclosed system and method enable to teach users more efficiently to make them resilient to the latest attacks in cyber security space.

The model is used to evaluate the threat level of training vectors to test if e.g. an internal red team (trained white-hat hackers, i.e., computer security experts) can build attacks that fool the AI model in use, and push to develop and explore new areas of attacks which cannot be detected by the AI model in use.

Figure 4:
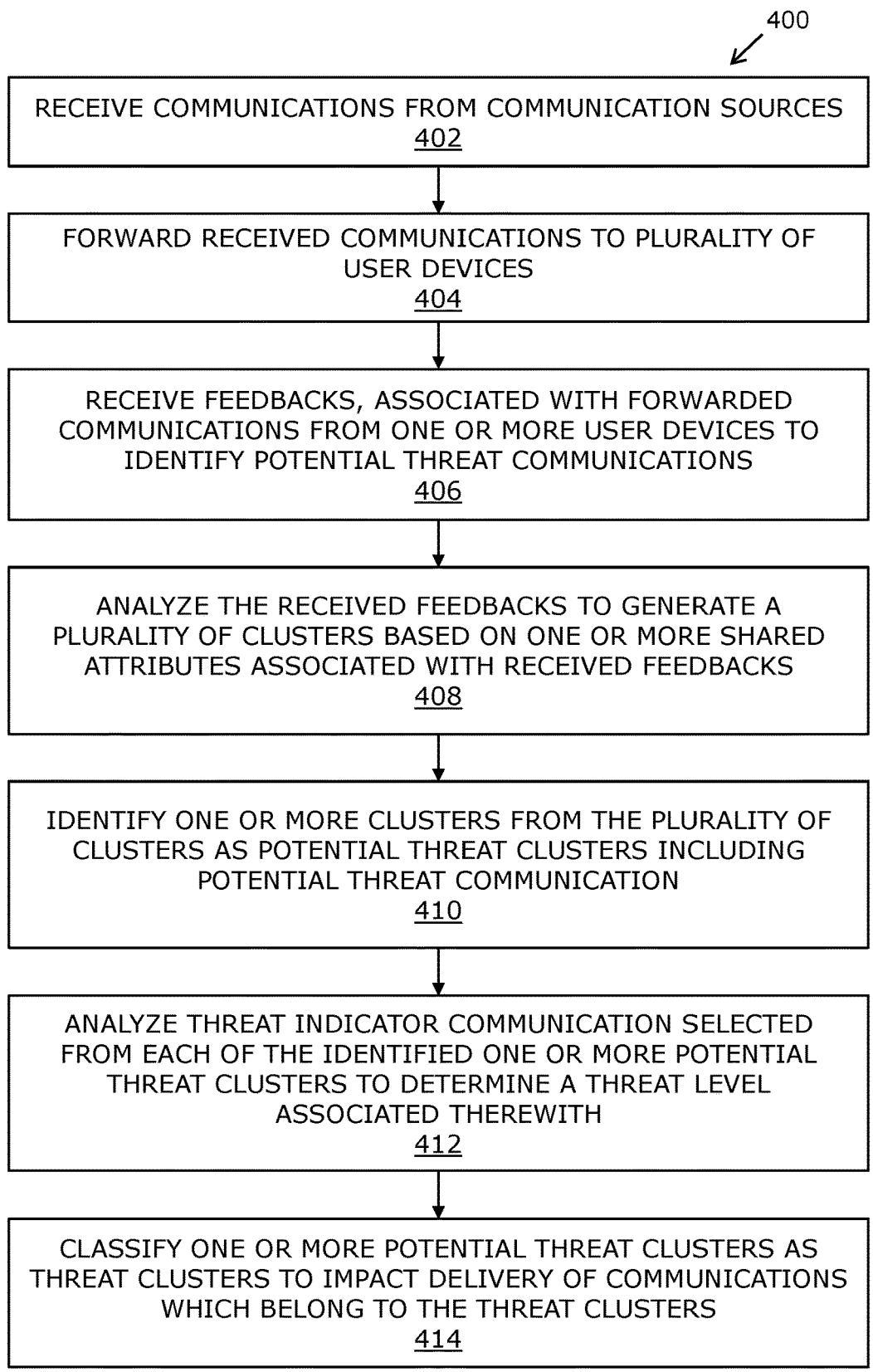
FIG. 4 is a flowchart depicting steps of a method for providing cybersecurity, in accordance with an embodiment of the present disclosure.

Referring to FIG. 4, illustrated is a flowchart 400 depicting steps of a method for providing cybersecurity, in accordance with an embodiment of the present disclosure. At step, 402 communications from one or more communication sources are received. At step, 404 the received communications are forwarded to the plurality of user devices. At step 406, feedbacks associated with the forwarded communications are received from one or more user devices of the plurality of user devices to identify potential threat communications. At step 408, each of the received communications are analyzed to generate a plurality of clusters based on one or more shared attributes associated with the received communications. At step 410, one or more clusters are identified from the plurality of clusters as potential threat clusters, including the at least one potential threat communication. At step 412, at least one threat indicator communication selected from each of the identified one or more potential threat clusters is analyzed to determine a threat level associated therewith. At step 414, the one or more potential threat clusters are classified as threat clusters, if the threat level of the at least one threat indicator communication is above a threshold threat level.

The steps 402 to 414 are only illustrative and other alternatives can also be provided where one or more steps are added, one or more steps are removed, or one or more steps are provided in a different sequence without departing from the scope of the claims herein.

Figure 5:
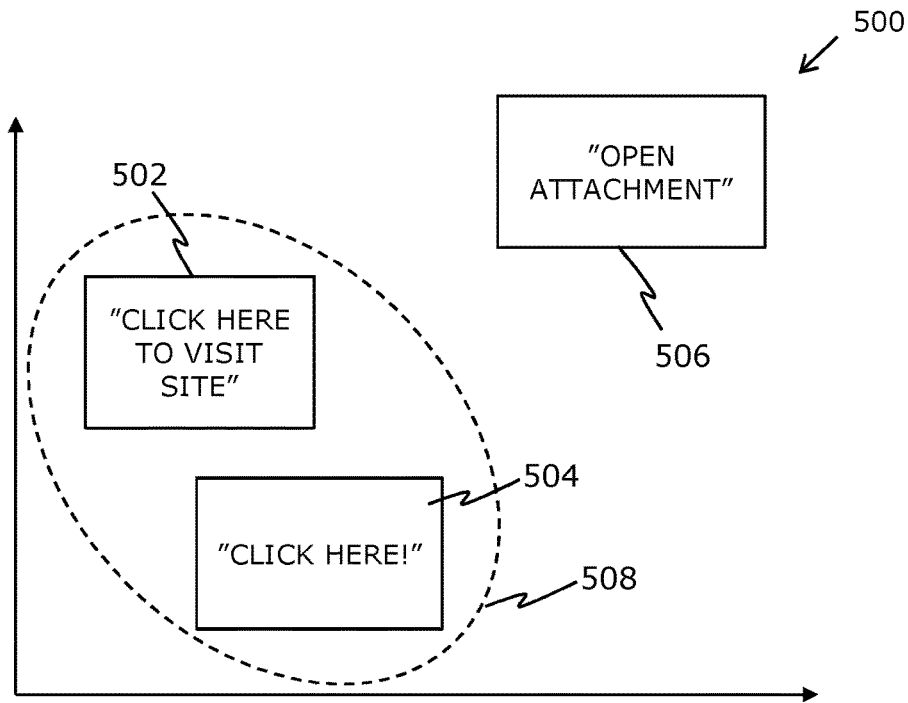
FIG. 5 is an illustration of communications having common language intent determined by the use of specific terms associated with malicious content.

Referring to FIG. 5, illustrated is an example of communications 500 having common language intent determined by the use of specific terms associated with malicious content like "CLICK HERE TO VISIT SITE" 502, "CLICK HERE" 504 and "OPEN ATTACHMENT" 506. Communications "CLICK HERE TO VISIT SITE" 502 and "CLICK HERE" 504 have a closer contextual distance forming a semantic cluster 508. The communication "OPEN ATTACHMENT" 506 has a farther contextual distance to the semantic cluster 508 thus having a lower threat score to the semantic cluster 508.

Figure 6:
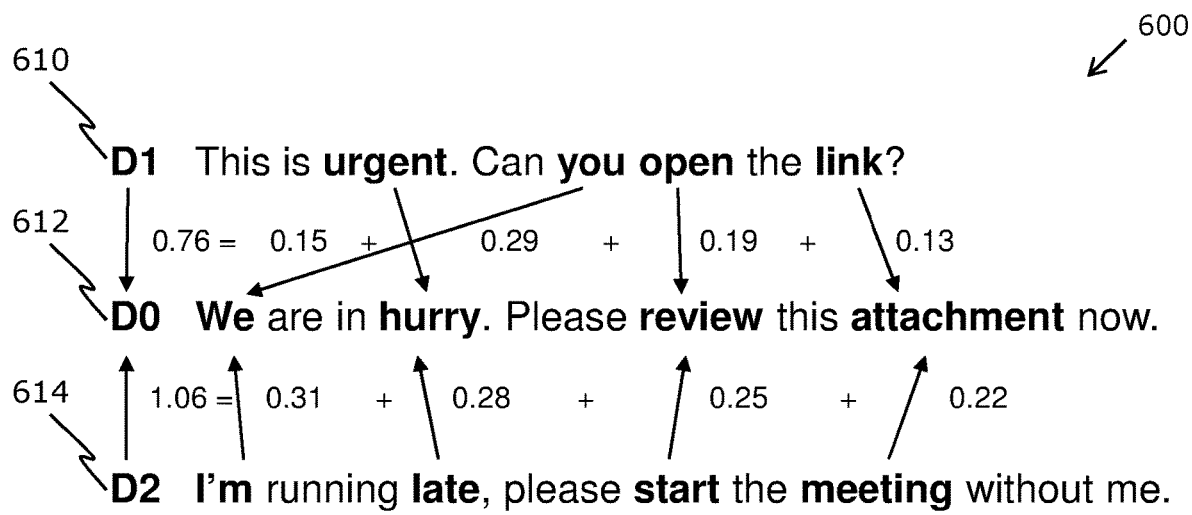
FIG. 6 is an illustration of two or more communications having a common language intent determined by capturing multiple different degrees of similarity between words and syntactic patterns reproduced using vector arithmetic.

Referring to FIG. 6, illustrated is an example of two or more communications having a common language intent determined by capturing multiple different degrees of similarity between words and syntactic patterns reproduced using vector arithmetic. Patterns such as "We are in hurry. Please review this attachment now.", "This is urgent. Can you open the link?" and "I'm running late, please start the meeting without me." can be generated through algebraic operations on the vector representations of these words. The vector representation of "you" of a vector D1 610 and "I'm" of a vector D2 614 produce a result which is closest to the vector representation of "we" of a vector D0 612 in the model. Such relationships can be generated for a range of semantic relations for other words such as "urgent"-"hurry", "late"-"hurry", "open"-"review", "start"-"review", "link"-"attachment", and "meeting"-"attachment". The vector representation is thus repeated for other words of the vector D1 610 and the vector D2 614 producing a summary result indicating that the vector D1 610 with a sum value 0.76 is closer to the vector D0 612 than the vector D2 614 with a sum value 1.06.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for providing cyber security, the system comprising a server arrangement communicatively coupled to a plurality of user devices, the server arrangement configured to:

receive a communication from one or more communication sources;

forward the received communication from the one or more communication sources to the plurality of user devices;

receive a feedback associated with the forwarded communication from one or more user devices of the plurality of user devices to identify at least one potential threat communication;

analyze each received feedback to generate a plurality of clusters by:

generating a semantic representation and establishing semantic relations between a first received communication and a second received communication;

identifying one or more shared attributes of the first received communication and the second received communication, based at least in part on the established semantic relations and the visual presentation of the first received communication and the second received communication;

calculating a similarity score for each of the identified shared attributes of the first received communication and the second received communication;

determining a cumulative similarity score by aggregating each of the calculated similarity scores calculated for each of the identified shared attributes between the first received communication and the second received communication; and generating a cluster, including the first received communication and the second received communication, if the determined cumulative similarity score is above a threshold similarity score;

identify one or more clusters from the plurality of clusters as potential threat clusters including the at least one potential threat communication;

analyze at least one threat indicator communication selected from each of the identified one or more potential threat clusters, to determine a threat level associated with the at least one threat indicator communication;

classify the one or more potential threat clusters as threat clusters, if the threat level of the at least one threat indicator communication is above a threshold threat level based on a level of security offered to each of the plurality of user devices; and perform one or more corrective actions for managing communications associated with the threat clusters, wherein the one or more shared attributes comprise at least one of a semantic relation of textual content between the received communications, a language intent of the received communications, and a visual presentation of the received communications, and wherein the visual presentation comprises one or more of a font, a color, a text block, a label, a text box, a list box, a line, an image window, a dialog box, a frame, a panel, a menu, a button, and an icon.

2. The system according to claim 1, wherein the one or more corrective actions comprise at least one of: firewall configuration, port configuration, disable reception of communications from one or more communication channels, remove the communications associated with threat clusters from each of the plurality of user devices, trigger an alert for each of the plurality of user devices.

3. The system according to claim 1, wherein each of the plurality of user devices comprises a plugin, in the form of a user interface element, to provide feedbacks in response to the forwarded communications.

4. The system according to claim 1, wherein the one or more shared attributes comprise at least one of: an origin information of the received communications, a format of the received communications, and an embedded information in the received communications.

5. The system according to claim 1,
wherein the visual presentation of the first received communication and the second received communication comprises one or more of a size and position of visual elements, a margin, and a spacing.

6. The system according to claim 1, wherein the server arrangement is configured to determine the threat level of at least one threat indicator communication by:
comparing the at least one threat indicator communication with pre-examined communications, wherein the pre-examined communications comprises a threat score;
determining a resemblance score of the at least one threat indicator communication with respect to the pre-examined communications;
selecting a pre-examined communication from the pre-examined communications having a highest resemblance score;
assigning the threat score of the pre-examined communication having the highest resemblance score, to the at least one threat indicator communication; and
determining the threat level of the at least one threat indicator communication based on the assigned threat score.

7. The system according to claim 6, wherein the server arrangement is configured to access the pre-examined communications from a cyber security database.

8. The system according to claim 2, wherein the server arrangement is configured to perform the one or more corrective actions in real-time.

9. The system according to claim 2, wherein the server arrangement is configured to perform the one or more corrective actions based on the threat level, and wherein the threat level is further categorized based on the assigned threat score into at least one of: a low threat level, a moderate threat level and a high threat level.

10. A method for providing cyber security, the method being implemented by a system comprising a server arrangement communicatively coupled to a plurality of user devices, the method comprising:
receiving communications from one or more communication sources;
forwarding the received communications to the plurality of user devices;
receiving a feedback associated with the forwarded communications from one or more user devices of the plurality of user devices, to identify potential threat communications;
analyzing the received feedback to generate a plurality of clusters by:
generating a semantic representation and establishing semantic relations between a first received communication and a second received communication;
identifying one or more shared attributes of the first received communication and the second received communication, based at least in part on the established semantic relations and the visual presentation of the first received communication and the second received communication;
calculating a similarity score for each of the identified shared attributes of the first received communication and the second received communication;
determining a cumulative similarity score by aggregating each of the calculated similarity scores calculated for each of the identified shared attributes between the first received communication and the second received communication; and
generating a cluster, including the first received communication and the second received communication, if the determined cumulative similarity score is above a threshold similarity score;
identifying one or more clusters from the plurality of clusters as potential threat clusters, including the at least one potential threat communication;
analyzing at least one threat indicator communication selected from the identified one or more potential threat clusters, to determine a threat level associated with the at least one threat indicator communication;
classifying the one or more potential threat clusters as threat clusters, if the threat level of the at least one threat indicator communication is above a threshold threat level based on a level of security offered to each of the plurality of user devices; and
performing one or more corrective actions for managing communications associated with the threat clusters,
wherein the one or more shared attributes comprises at least one of a semantic relation of textual content between the received communications, a visual presentation of the received communications, a language intent of the received communications, and a format of the received communications, and
wherein the visual presentation comprises one or more of a font, a color, a text block, a label, a text box, a list box, a line, an image window, a dialog box, a frame, a panel, a menu, a button, and an icon.

11. The method according to claim 10, wherein the one or more corrective actions comprise at least one of: firewall configuration, port configuration, disable reception of communications from one or more communication channels, remove the communications associated with threat clusters from each of the plurality of user devices, trigger an alert for each of the plurality of user devices.

12. The method according to claim 10, wherein the feedbacks are received from the one or more user devices of the plurality of user devices in response to the forwarded communications via a plugin, provided in the form of a user interface element.

13. The method according to claim 10, wherein the one or more shared attributes comprise at least one of: an origin information of the received communications, a format of the received communications, and an embedded information in the received communications.

14. The method according to claim 10,
wherein the visual presentation of the first received communication and the second received communication comprises one or more of a size and position of visual elements, a margin, and a spacing.

15. The method according to claim 10, wherein determining the threat level of at least one threat indicator communication comprises:

comparing the at least one threat indicator communication with pre-examined communications, wherein a threat score is associated with each of the pre-examined communications;
determining a resemblance score of the at least one threat indicator communication with respect to each of the pre-examined communications;
selecting a pre-examined communication having a highest resemblance score from the pre-examined communications;
assigning the threat score of the pre-examined communication having the highest resemblance score to the at least one threat indicator communication; and
determining the threat level of the at least one threat indicator communication based on the assigned threat score.

16. The method according to claim 15, wherein the pre-examined communications are accessed from a cyber security database.

17. The method according to claim 13, wherein the one or more corrective actions are performed in real-time.

18. The method according to claim 15, further comprising performing the one or more corrective actions based on the threat level, wherein the threat level is further categorized based on the assigned threat score into at least one of: a low threat level, a moderate threat level and a high threat level.

* * * * *